No. 768,406. PATENTED AUG. 23, 1904.
J. O. SMITH.
ANIMAL TRAP.
APPLICATION FILED MAY 3, 1904.
NO MODEL.
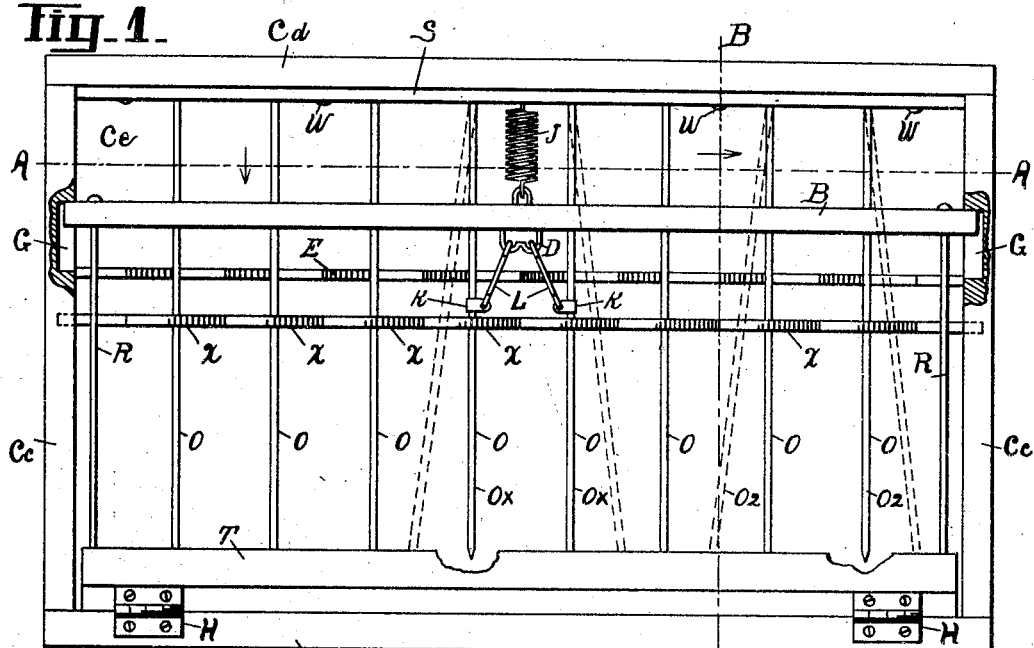
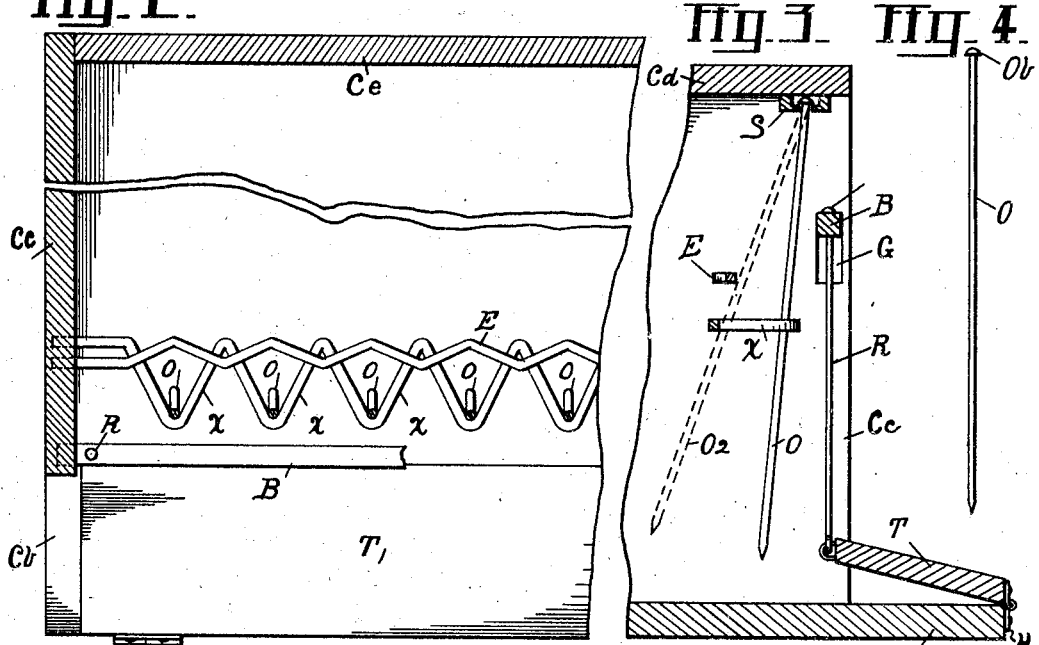
Witnesses
Aaron Fretz
Dr. A. M. Ruhl
Inventor
John O. Smith.
By
Frank P. Shepard, Attorney.

No. 768,406. Patented August 23, 1904.

UNITED STATES PATENT OFFICE.

JOHN O. SMITH, OF EDMOND, OKLAHOMA TERRITORY.

ANIMAL-TRAP.

SPECIFICATION forming part of Letters Patent No. 768,406, dated August 23, 1904.

Application filed May 3, 1904. Serial No. 206,244. (No model.)

*To all whom it may concern:*

Be it known that I, JOHN O. SMITH, a citizen of the United States, and a resident of Edmond, in the county of Oklahoma and Territory of Oklahoma, have invented a new and useful Animal-Trap, of which the following is a full, clear, and exact description, reference being had to the drawings hereto annexed.

The object of the invention is to provide a trap which shall more nearly meet the requirements of such devices than those heretofore used.

In carrying out the objects stated the operation of the trap has been made such that entrance into it is easy and inviting, while passage out of it is impossible, and all of the parts are so planned that they are cheap and easy to construct.

Referring to the drawings, Figure 1 is a front elevation of the trap. Fig. 2 is a horizontal section of a portion of the trap, taken on the line A A, Fig. 1. Fig. 3 is a vertical section taken on the line B B, Fig. 1. Fig. 4 shows one of a series of rods or bars used in the entrance of the trap, and Fig. 5 is a plan view of a perforated metal strip from which said rods are suspended.

Referring to the several figures, in all of which like characters of reference designate like parts, a box or casing is provided and is composed of the bottom portion $C^b$, which projects forward beyond the other parts, the sides $C^c$, the top $C^d$, and the back $C^e$, the sides of the casing upon which the bottom $C^d$ projects being left open and known as the "front" of the trap throughout the following description.

The front or open side of the trap is closed against the outward passage of the animal by wire rods O, which are suspended from the top $C^d$ of the casing and whose ends are pointed sharp and hang nearly to the bottom $C^b$. A metal strip S (shown by Fig. 5) is secured to the under edge of the top $C^d$ along its front edge by nails W and is provided at regular intervals throughout its entire length with perforations $S^b$, down through which the rods O loosely hang. The rods O are provided with round-topped heads $O^b$ for suspending them in the strip S, and the perforations $S^b$ are countersunk upon the upper side of the said strip by a shallow groove $S^c$, so that the heads $O^b$ may clear the top portion $C^d$ and allow the rods O to swing freely. When the rods O hang parallel with each other, they are in their closed position, and they are suspended close enough together so that when in said position the animal cannot pass between them. Each rod O is provided with a V-shaped guiding member X, which stands with its open end inwardly of the trap and in the front or crotch end of which said rod hangs when in its closed position. The V-shaped guides X are integral with each other and are formed of one continuous wire or rod, which is supported by having its ends inserted into the sides $C^c$. These guides X should be placed far enough inward so that the rods O when in their closed position are all inclined inward at their lower ends, as shown in Fig. 3. This arrangement will insure the positive seating of the rods O in the crotch ends of their guides X and prevent them from accidentally swinging or standing inward from their closed positions.

The animal in attempting to get into the trap will squeeze in between two of the rods O, and in so doing will swing said two rods toward the inner or wider ends of their guides, as shown by the dotted representations $O^2$ in Fig. 3, during which movement said guides X will allow them to swing apart, as shown by the same reference characters in Fig. 1, and allow the animal to pass in. After the animal has passed into the trap the rods O swing back to the front or crotch ends of their guides and any attempt of the animal to pass out of the trap will cause said rods to remain the more firmly in their closed position.

The guides X should be placed high enough so that the animal can pass in below them, and in order to prevent any of the rods from swinging too far inward and accidentally dropping over into the guide of the adjacent rod a limiting-bar E is mounted in the rear of said rods and has its ends inserted into the sides $C^c$ for support. In swinging inward the rods O come in contact with the bar E before they have swung entirely out of their guides, and said bar may, if desired, be so shaped or bent that the rods O approach and strike it, not obliquely, but in a line perpendicular to its surface. Lying upon the front or projecting portion C$^b$ is an apron or approach T, whose outer or front edge is secured pivotally to the front edge of the said bottom by metal hinges H, and whose inner edge is approximately on a line with the front edges of the sides C$^c$. Secured pivotally to the rear or inner edge of the approach T at each of its ends are rods R, which extend upward and are secured to the ends of a horizontal bar B.

The ends of the bar B extend loosely into vertical grooves G in the inner faces of the sides C$^c$ and are adapted to slide vertically therein. A tension coil-spring J, whose lower and upper ends are secured, respectively, to the central part of the bar B and to the top C$^e$ of the trap, yieldingly supports said bar, the rods R, and the inner edge of the apron T. The upward and downward movements of the bar B and the parts attached to said bar are limited by the upper and lower ends, respectively, of the grooves G. At a point on the bar B midway between two of the rods O, preferably the two central ones O$^x$, two wire connecting-rods L are secured pivotally to the lower side of said bar by the staple D. These rods L extend down obliquely to said rods O$^x$—say at an angle of about forty-five degrees—and are secured pivotally to lugs K, which are formed upon said rods O$^x$. The pivotal connections thus formed should work perfectly free during movements of the parts in any direction. As the animal steps onto the approach T his weight depresses the inner edge of said approach, which through the rods R draws the bar B downward against the force of the spring J. In moving downward the bar B, acting through the rods L, swings the two rods O$^x$ inward and apart, as shown by the dotted representations in Figs. 1 and 3.

By the arrangement and operation of parts just described entrance into the trap between any of the rods is easy and inviting, while at least one point of entrance stands wide open as long as the animal remains upon the approach T. As the animal passes into the trap his weight is removed from the approach T, and the spring J returns all of the parts to their closed position.

The foregoing being a full, clear, and exact description of my improved trap, what I claim, and desire to secure by Letters Patent, is—

1. In an animal-trap, a box portion having an opening in its side, said opening being closed against the outward passage of the animal by downwardly-hanging rods, means associated with said rods whereby the inward swinging of their lower ends will allow said ends to swing apart, substantially as described.

2. In an animal-trap, a box portion having an opening in its side, said opening being closed against the outward passage of the animal by downwardly-hanging rods, said rods having means associated with them whereby the inward swinging of their lower ends will allow said ends to swing apart as the animal passes in, said rods being adapted to swing back to closed position and remain there during any attempt of the animal to pass out, substantially as described.

3. An animal-trap comprising a box portion having an opening in its side, said opening being closed against the outward passage of the animal by rods suspended pivotally from its upper edge, the lower ends of said rods being free to swing inward, guides for allowing said rods to swing laterally as they swing inward, the action of the guides being such that the lateral swinging is contingent upon the inward swinging of said rods, substantially as described.

4. An animal-trap comprising a box portion having an opening in its side, said opening being closed against the outward passage of the animal by vertical rods suspended from its upper edge, said rods hanging through the crotch ends of V-shaped guides, the wider or open ends of said guides standing inwardly of the trap whereby they will allow the rods to swing inwardly and apart as the animal passes in, and remain in closed position at other times, substantially as described.

5. An animal-trap comprising a box portion having an opening in its side, a series of V-shaped guides mounted at regular intervals throughout the width of the opening, a series of rods suspended from the upper edge of said opening and closing the same against the outward passage of the animal, said rods hanging within the crotch ends of said guides and being thus adapted to swing inward and sidewise as the animal attempts to pass in between them, substantially as described.

6. In an animal-trap, a box portion having an opening in its side, the opening being closed against the outward passage of the animal by downwardly-hanging rods, means associated with said rods whereby they will swing apart by the action of the animal in attempting to pass in between them, means associated with a pair of said rods whereby the two rods of said pair will swing apart by the weight of the animal as he approaches the trap, substantially as described.

7. In an animal-trap, a box portion having an opening in its side, the opening being closed against the outward passage of the animal by parallel rods suspended from its upper edge, said rods being adapted to swing from their parallel or closed position by the action of the animal in attempting to enter the box, and to remain in parallel or closed position by the action of the animal in attempting to pass out, a depressible approach lying in front of said box, said approach being operatively connected with a pair of said rods, whereby the weight of the animal when on said approach will swing the two rods of said pair apart, substantially as described.

8. In an animal-trap, a box portion having an entrance in its side, said entrance being closed against the outward passage of the animal by rods hanging from its upper edge, the rods each hanging through the crotch end of a V-shaped guide, the wider or open ends of said guides standing inwardly of the box whereby the inward swinging of the rods will allow them to swing apart, a limiting-bar mounted upon the inner side of said rods to limit their inward movement, an apron or approach leading to the entrance, said approach being depressible by the weight of the animal and being operatively connected with a pair of the rods, whereby the two rods of said pair will swing apart by the weight of the animal as he mounts the approach, substantially as described.

In testimony whereof I have signed this specification, in the presence of two subscribing witnesses, this 11th day of April, 1904.

JOHN O. SMITH.

Witnesses:
EDGAR L. EDWARDS,
J. H. HUBBLE.